(No Model.)

H. B. REED.
VINEYARD CULTIVATOR.

No. 373,906. Patented Nov. 29, 1887.

Witnesses,
Geo. H. Strong.
J. H. Towne.

Inventor,
H. B. Reed
By Dewey & Co.
attys

UNITED STATES PATENT OFFICE.

HORACE B. REED, OF WOODLAND, CALIFORNIA.

VINEYARD-CULTIVATOR.

SPECIFICATION forming part of Letters Patent No. 373,906, dated November 29, 1887.

Application filed March 30, 1887. Serial No. 233,059. (No model.)

*To all whom it may concern:*

Be it known that I, HORACE B. REED, of Woodland, Yolo county, State of California, have invented an Improvement in Vineyard-Cultivators; and I hereby declare the following to be a full, clear, and exact description of the same.

My invention relates to improvements in cultivators, and it is especially applicable to that class which are used for cultivating in vineyards or other fields where the vines to be cultivated are in regular rows.

It consists of a standard secured to the plow-beam, extending downward toward the ground, and having an angle made in it at a point near the blade, so that the shank extends diagonally across the blade or shovel, to which it is secured, and in combination with this angular shank I employ a joint and breaking-pin, the joint being made in the angular portion, so that if the blade or shovel strikes any obstruction which will break the pin the blade will be turned to one side and clear of the obstruction by reason of the angle.

Figure 1:
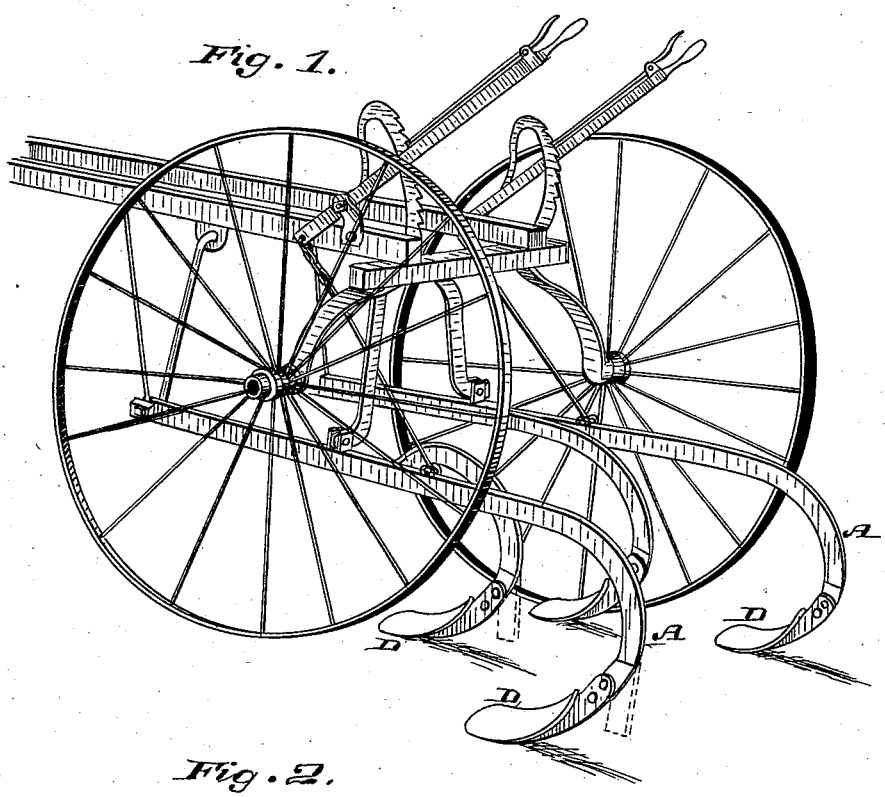
Figure 2:
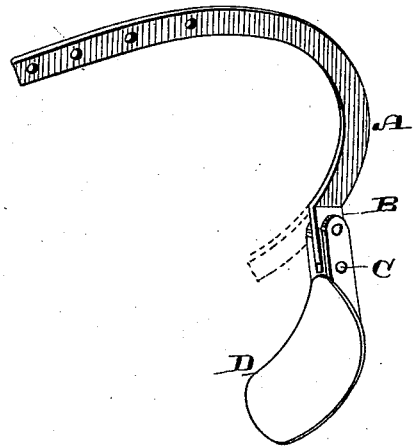
Figure 3:
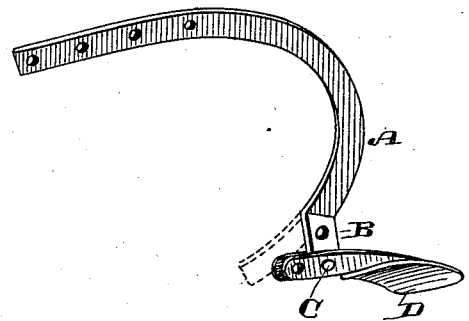

Referring to the accompanying drawings for a more complete explanation of my invention, Figure 1 is a view of a cultivator, showing the application of my device thereto. Fig. 2 is a separate view of a standard with the angular bent joint and diagonally-attached blade or shovel. Fig. 3 shows the blade or shovel turned back.

A is the standard by which the cultivator shovel or tooth is supported.

In the present case I have shown my device as applied to cultivators having four teeth, which are set in pairs, so that two will travel on each side of the row to be cultivated, the pairs of teeth traveling, also, in different lines.

In my cultivator the shank or standard A is bent to an obtuse angle, as shown at B, so that the lower portion of it stands in a different plane from that part which is attached to the frame-work. I have shown this lower portion jointed at C, so that a breaking-pin may be passed through a hole in the two parts a short distance from the fulcrum-pin, and when any severe strain is brought upon the cultivator by striking an obstruction the breaking of this pin allows the tooth to swing backward and be relieved from the obstruction.

In my device the tooth or shovel D is fixed upon the lower part of the shank, which, by reason of its being bent, as before described, will extend diagonally across the shovel, the sides of the shovel standing nearly or quite vertically, as shown. By reason of the angular bend made in the standard it will be seen that when the breaking-pin allows the tooth to swing backward it not only swings backward, but also to one side, and entirely out of the way of the obstruction.

I do not claim, broadly, the employment of a breaking-pin for a cultivator-tooth; but What I do claim as new, and desire to secure by Letters Patent, is—

1. The cultivator-tooth having the shank or standard with the lower part bent laterally, so as to stand diagonally across the tooth which is bolted to it, and the upper part standing in a vertical plane and secured to the beam, substantially as herein described.

2. The standard, the upper part of which is fixed to the frame and stands in a vertical line, while the lower part is bent laterally, so as to stand at an obtuse angle with the upper part and transversely across the blade or shovel-tooth, said lower part being jointed and having a breaking-pin passing through it near the fulcrum, substantially as and for the purpose herein described.

In witness whereof I have hereunto set my hand.

HORACE B. REED.

Witnesses:
S. H. NOURSE,
H. C. LEE.